March 4, 1930. L. IVERSEN 1,749,430
ROTARY SHEARS
Filed April 3, 1926 2 Sheets-Sheet 1

INVENTOR

March 4, 1930.  L. IVERSEN  1,749,430

ROTARY SHEARS

Filed April 3, 1926   2 Sheets-Sheet 2

INVENTOR

Patented Mar. 4, 1930

1,749,430

UNITED STATES PATENT OFFICE

LORENZ IVERSEN, OF PITTSBURGH, PENNSYLVANIA

ROTARY SHEARS

Application filed April 3, 1926. Serial No. 99,595.

The present invention relates broadly to the art of metal cutting, and more particularly to the art of cutting metal shapes, such as sheets, bars, strips and the like, while moving at a comparatively high speed, in order to produce predetermined lengths.

It has heretofore been customary in the art to which the present invention relates to provide means for effecting shearing of moving shapes, such means having the ability to attain an instantaneous cutting speed substantially equal to the speed of movement of the material being cut. Most of these shears are of the intermittently operating type in which the shear starts and stops for each cutting operation. While devices of this character have been effective for the purposes indicated, they have been objectionable for many reasons, the principal of which is the difficulty of attaining the speed desired in the time permitted, by reason not only of the mass of the moving parts, but also the difficulties of obtaining acceleration. In an effort to overcome the objections which are inherent in shears of the character referred to, attempts have been made to produce continuously operating shears. Such shears, however, have not only been extremely complicated, thereby requiring constant attention, but they have not been sufficiently flexible in operation to meet the requirements with respect to lengths into which the material must be cut and the different speeds at which the material is delivered thereto.

In designing flying shears of any type, consideration must not only be given to the question of design to provide the necessary strength, but to a design such that the mass is kept low to permit acceleration, and in which the time interval between starting and cutting will permit the desired speed to be obtained. With ordinary rotating cutting blades, it will be apparent that if the blades are stopped shortly after the completion of the cut, a carrier of comparatively large diameter must be provided in order to permit the shears to attain the desired speed during rotation from the point at which the shears were stopped to the cutting point. This, however, is objectionable for the reason that the diameter necessary to permit the attainment of such a speed necessarily involves a considerable mass.

The present invention has for certain of its objects the provision of a shear which may be either continuously or intermittently operated and which is of such nature that it will effectively cooperate with material moving at any ordinary speed represented by mill operation at the present time, and cut such material into any desired length or multiple thereof.

Another object of the invention is to provide a shear in which the moving parts may have an extremely small mass as compared to shears as constructed at the present time and in which provision is made for the desired acceleration prior to each cutting operation.

Still another object of the present invention is to provide a shear which may be continuously operated at a speed bearing a definite relation to the speed of travel of the material to be sheared and which at that speed is effective for shearing the material into any predetermined length or multiple of that length.

In the accompanying drawings, there is shown for purposes of illustration only a preferred embodiment of the present invention, it being understood that the drawings do not define the limits of my invention as changes in the construction and operation disclosed therein may be made without departing either from the spirit of the invention or the scope of the broader claim. In the drawings:

Figure 1:
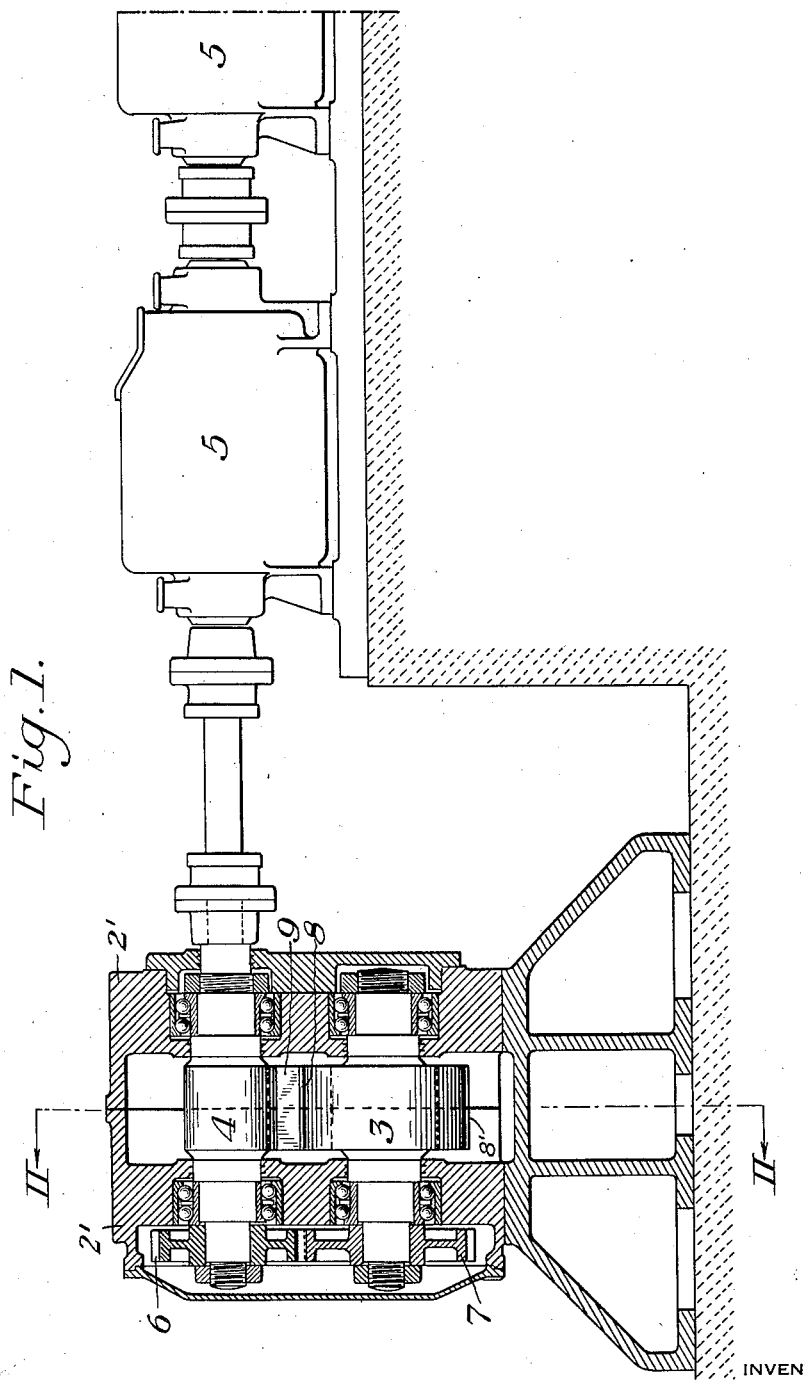
Figure 1 is a vertical sectional view through a shear embodying the present invention, the driving means for the shear being shown in elevation.
Figure 2:
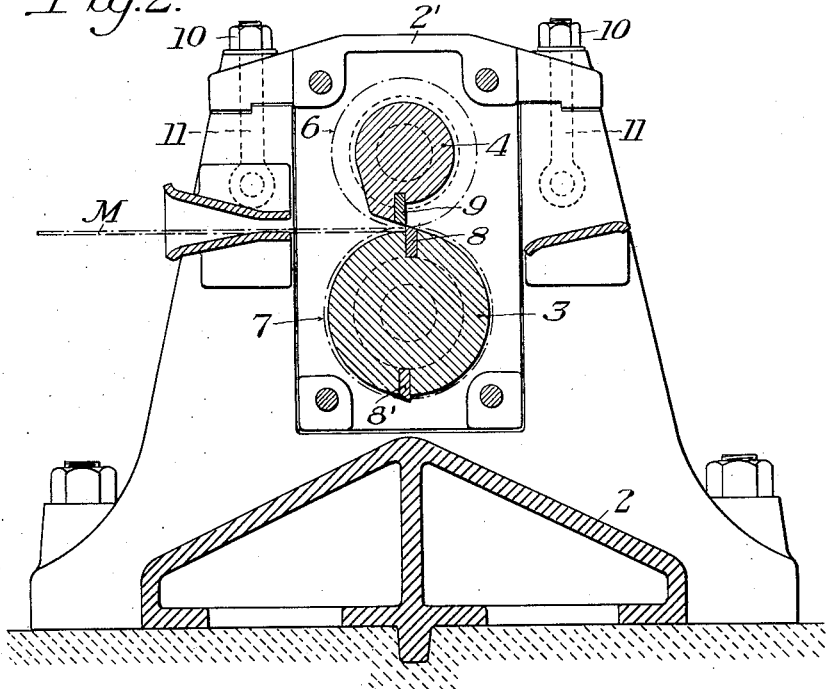
Figure 2 is a vertical sectional view on the line II—II of Figure 1, looking in the direction of the arrows.

In carrying out the present invention, there may be provided a shear frame or housing 2 of any desired construction having mounted therein a lower rotor or shear carrier 3 and an upper rotor or shear carrier 4. As clearly shown more particularly in Figure 2 of the drawings, the rotors 3 and 4 are of different diameters, the rotor 4 conveniently being driven in any desired manner, as by a motor or motors 5. Rotation is, in turn, imparted to the lower rotor 3 by a suitable gear 6, splined to the rotor 4 and meshing with gear 7 secured to the rotor 3. The gears 6 and 7 are likewise of different diameters, whereby in the operation of the shear, the rotors will each have imparted thereto a different number of complete revolutions per unit of time.

Carried by the rotor 3 are shear blades 8 and 8', while carried by the rotor 4 is a similar shear blade 9. The rotor 3 may be constructed for the reception of any desired number of blades for the purpose hereinafter more fully pointed out.

Figure 3:
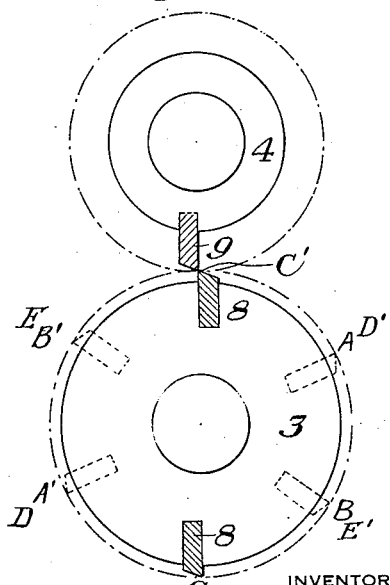
Figure 3 is a diagrammatic view illustrating the operation of the shear shown in Figures 1 and 2.

For the purpose of illustrating the operation of the shear, let us assume that the diameter of the rotor and the selection of the gears is such that the lower rotor 3 makes five revolutions for each six revolutions of the rotor 4. Under such conditions the shear blades 8 and 9 will come into the shearing position illustrated in Figure 3 once during each six revolutions of the rotor 4 as will clearly be apparent from Figure 3. Likewise the blades 8' and 9 will come into shearing position once during each six revolutions of the rotor 4 and three revolutions preceding or subsequent to the coming into shearing position of shear blades 8 and 9, as will be clearly apparent from Figure 3. In this figure, the positions of the shear blades 8 and 8' at the end of the first revolution of the rotor 4 are represented by the letters A and A' respectively. The positions of the blades 8 and 8' at the end of the second revolution of the rotor 4 are represented by the letters B and B' respectively. The positions of the blades 8 and 8' at the expiration of the third revolution of the rotor 4 are represented by the letters C and C' respectively. It is apparent from Figure 3, at the end of the third revolution of the rotor 4 the blades 8' and 9 are in cooperative shearing relationship. At the end of the fourth revolution of the rotor 4 the positions of the blades 8 and 8' are represented by the letters D and D' respectively. At the end of the fifth revolution of the rotor 4, the positions of the blades 8 and 8' are represented by the letters E and E' respectively. At the end of the sixth revolution of the rotor 4, the blades 8 and 8' will again occupy the solid line position shown in Figure 3, and the blades 8 and 9 will be in shearing position. During each of the first three revolutions of the rotor 4, the material M being sheared rides idly over the lower shearing blades 8 and 8' and under the shearing blade 9. At the end of the third revolution, as pointed out heretofore, the blades 8' and 9 will be in shearing position and the material M will be sheared. During the next three revolutions of the rotor 4, the material M being sheared will again ride idly over the blades 8 and 8' and under the blade 9, and at the end of the sixth revolution the blades 8 and 9 will come into shearing position, as illustrated in Figure 3.

Assuming that it is desired to cut a piece of material moving at a speed equal to the peripheral speed of the rotors, and assuming further that the circumference of the rotor 4 is six feet, it is evident that since the blades come into cutting position once in three revolutions of the rotor 4 the pieces cut will be eighteen feet in length. By properly selecting the length of the peripheral path through which the cutting blade passes, it is possible to effect shearing into any desired length at the same speed of movement of the material and with the same speed of rotation of the shear. Furthermore, by selecting the proper number and arrangement of blades on the rotor 3, the cutting length may be varied while maintaining a predetermined speed of operation.

The construction of the frame or housing 2 may be made such as to facilitate the bodily removal of one pair of rotors and the substitution of a new pair of rotors, such operation being possible by loosening the nuts 10 on the swinging bolts 11, swinging the bolts laterally, and then bodily lifting the rotor housing 2' from the housing 2. Thereafter, a new rotor housing with its rotors and gears proportioned to cut the desired length may be slipped into position.

While it is a generally accepted fact that it is desirable to provide an instantaneous cutting speed of the shear blades which is substantially equal to the speed of travel of the material being sheared, I have found that the instantaneous speed of the cutting blades may be different from the speed of the material to a considerable extent, this depending largely upon the characteristics of the material being sheared.

This difference in speeds may be utilized, if desired, for producing variations in the lengths into which the material is being sheared, without any change in the number of the shear blades or without any change in the rotor housings and associated parts. For example, a given set of rotors may be effectively utilized with certain materials for cutting into lengths which might vary from twenty to twenty-four feet more or less.

The motor or motors 5 provided for driving the shears may be of any desired construction, but are preferably direct current motors, whereby the desired variation in speed may be easily obtained, and are supplied by a source of electric current under a potential which can preferably be definitely set and maintained at that setting.

It will be apparent that a shear of the character described may be effectively utilized as a continuously operating shear for cutting material to the desired lengths, or that it may be utilized as an intermittently operating shear, the time interval during which the material moves between successive shears being utilized, approximately one-half for the start of the shear and one-half for the stopping. This is possible with the shear herein shown, by reason of the fact that even though a small rotor is provided, a number of revolutions of such rotor is necessary for each shearing operation, thereby providing a period of time equal to or greater than one complete revolution for starting and a similar time for stopping. Where two cutting blades are provided, substantially one and one-half complete revolutions will be available for starting and an equal amount of time for stopping the shear. It is evident that the shear must be stopped and started at a fixed point every time, which is accomplished by well known means and controlled by the material being sheared, as well understood in the art.

Certain advantages of the present invention arise from the provision of a shear which may be operated at will either as a continuously moving shear or as an intermittently moving shear. Another advantage of the present invention arises from the provision of a shear of extremely simple construction which may be effectively utilized to cut material into any predetermined length or multiple thereof.

Further advantages of the invention arise from the provision of a shear so mounted as to permit bodily removal of the rotor housing and its associated parts and the substitution of another housing at will.

A still further advantage arises from the provision of a flying shear, comprising rotors operable at different speeds, whereby predetermined cutting blades on the rotors come into shearing relation but once during a multiple number of revolutions thereof. A still further advantage of the invention arises from the provision of a flying shear which is effective for shearing at any practical delivery speed of the material.

I claim:

In a shear, a rotor having a single blade thereon, a second rotor having a plurality of blades thereon, and means for bringing a predetermined blade on said last mentioned rotor into shearing relation with the blade on said first mentioned rotor once during a plurality of revolutions of both of said rotors, substantially as described.

In testimony whereof I have hereunto set my hand.

LORENZ IVERSEN.